United States Patent
Yoneyama

(10) Patent No.: US 11,345,027 B2
(45) Date of Patent: May 31, 2022

(54) SIMULATION DEVICE

(71) Applicant: FANUC CORPORATION, Yamanashi (JP)

(72) Inventor: Hiroyuki Yoneyama, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 192 days.

(21) Appl. No.: 16/860,139

(22) Filed: Apr. 28, 2020

(65) Prior Publication Data

US 2020/0391377 A1 Dec. 17, 2020

(30) Foreign Application Priority Data

Jun. 13, 2019 (JP) .............................. JP2019-110626

(51) Int. Cl.
*B25J 9/16* (2006.01)
*B25J 9/04* (2006.01)
*B25J 9/00* (2006.01)

(52) U.S. Cl.
CPC ........... *B25J 9/1605* (2013.01); *B25J 9/0093* (2013.01); *B25J 9/042* (2013.01); *B25J 9/1664* (2013.01)

(58) Field of Classification Search
CPC ........ B25J 9/1605; B25J 9/0093; B25J 9/042; B25J 9/1664
See application file for complete search history.

(56) References Cited

U.S. PATENT DOCUMENTS

| | | | |
|---|---|---|---|
| 2015/0246778 A1* | 9/2015 | Koga ................. | G05B 19/4182 700/259 |
| 2017/0235300 A1* | 8/2017 | Maruno ............ | G05B 19/4182 700/112 |
| 2018/0117766 A1* | 5/2018 | Atohira .................. | B25J 9/1697 |

FOREIGN PATENT DOCUMENTS

JP 2018140476 A 9/2018

* cited by examiner

*Primary Examiner* — Dale Moyer
(74) *Attorney, Agent, or Firm* — Studebaker & Brackett PC

(57) ABSTRACT

A simulation device according to the present disclosure includes: a model arrangement unit which arranges three-dimensional models of a feeder, a robot and a receiving device in virtual space; a workpiece supply unit which arranges the three-dimensional model of the workpiece on the conveyor surface; and a robot operation control unit which causes the robot to operate so as to move the workpiece on the conveyor surface to over the receiving surface, in which the workpiece supply unit includes: a reference position calculation part which calculates a position and orientation of the workpiece to be newly arranged, according to set conditions; a workpiece area setting part which sets a workpiece area occupied by the workpiece; an interference area setting part which sets an interference area adjacent to the workpiece area; a display control part which displays a screen indicating the workpiece area and the interference area; and a supply position adjustment part which adjusts a relative position of the workpiece to be newly arranged, so that the workpiece area of the workpiece to be newly arranged does not overlap with the workpiece area and the interference area of the workpiece arranged previously.

7 Claims, 5 Drawing Sheets

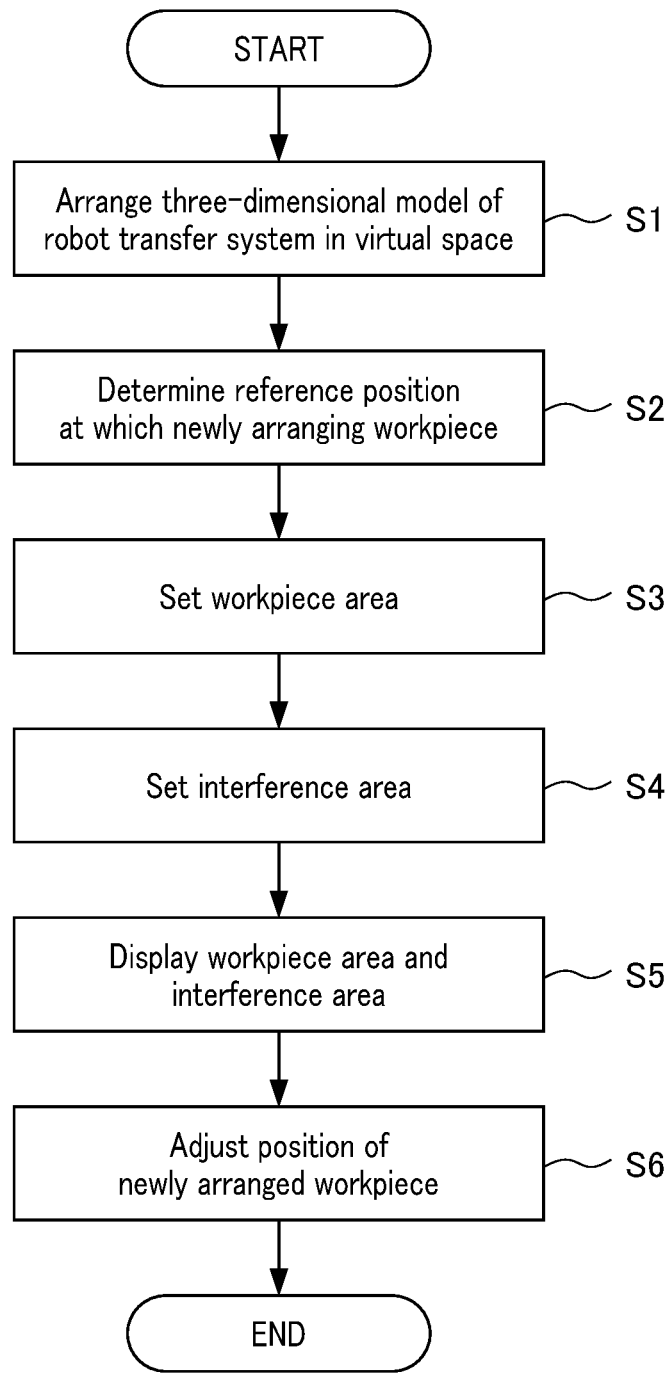

SIMULATION DEVICE

This application is based on and claims the benefit of priority from Japanese Patent Application No. 2019-110626, filed on 13 Jun. 2019, the content of which is incorporated herein by reference.

BACKGROUND OF THE INVENTION

Field of the Invention

The present invention relates to a simulation device.

Related Art

For example, a robot transfer system which picks up workpieces supplied one after another by a belt conveyor or the like, and sequentially transfers to another belt conveyor, table or the like has been known. In addition, a simulation system which artificially confirms the operation of such a robot transfer system has also been proposed.

As an example, Patent Document 1 discloses "a simulation device for a robot system in which a robot carries out a work on a plurality of workpieces conveyed by a simulation device comprising: a model arrangement section configured to arrange, in a virtual space, a plurality of workpiece models and a conveyor device model that model the plurality of workpieces and the conveyor device, respectively; an offset setting section configured to set an offset amount of each workpiece model from its reference position predetermined with respect to the conveyor device model; a conveying operation execution section configured to carry out a conveying operation to sequentially convey the plurality of workpiece models, each of which is arranged at a position obtained from the reference position and the offset amount, by the conveyor device model; an interference detection section configured to detect interference between at least two workpiece models sequentially conveyed by the conveyor device model; a non-interfering position search section configured to search a non-interfering position where the interference does not occur for at least one of the at least two workpiece models for which the interference is detected; and a workpiece position correction section configured to correct a position of the at least one workpiece model arranged on the conveyor device model, based on the searched non-interfering position."

Patent Document 1: Japanese Unexamined Patent Application, Publication No. 2018-140476

SUMMARY OF THE INVENTION

With the simulation device described in Patent Document 1, in the case of workpiece models interfering, the position of either workpiece model is corrected to eliminate the interference between workpiece models. However, in the case of a hand of a robot being a gripper which retains a lateral face of the workpiece, even if configuring so that the workpieces do not interfere, since the gripper will interfere with a workpiece located in the vicinity of the retained workpiece, trouble will arise when performing the same operation with an actual robot transfer system. In addition, even if the hand uses a suction cup to absorb the top surface of a workpiece, there are cases where elasticity for pushing the suction cup against the workpiece acts so as to cause the cup to move transversely, acts so as to cause the workpiece to slightly move transversely, and workpieces which should not interfere in theory will interfere. Therefore, a simulation device has been desired which can accurately confirm the appropriateness of operation of a robot in a robot transfer system.

A simulation device according to an aspect of the present disclosure is a simulation device which artificially confirms operation of a robot transfer system including: a feeder having a conveyor surface on which a workpiece is arranged; an image processing device which photographs the workpiece on the conveyor surface and calculates a position of the workpiece; a robot which has a hand that retains the workpiece on the conveyor surface, and picks up the workpiece from the conveyor surface based on a calculation result of the image processing device; and a receiving device which has a receiving surface on which the workpiece is arranged by the robot, the simulation device including: a model arrangement unit which arranges three-dimensional models of the feeder, the robot and the receiving device in virtual space; a workpiece supply unit which arranges the three-dimensional model of the workpiece on the conveyor surface in the three-dimensional model of the feeder; and a robot operation control unit which causes the three-dimensional model of the robot to operate so as to move the three-dimensional model of the workpiece on the conveyor surface to over the receiving surface, in which the workpiece supply unit includes: a reference position calculation part which calculates a position and orientation of the workpiece to be newly arranged, according to set conditions; a workpiece area setting part which sets a workpiece area occupied by the workpiece; an interference area setting part which sets an interference area adjacent to the workpiece area; and a supply position adjustment part which adjusts a relative position of the workpiece to be newly arranged, so that the workpiece area of the workpiece to be newly arranged does not overlap with the workpiece area and the interference area of the workpiece arranged previously.

According to the present disclosure, it is possible to provide a simulation device which can accurately confirm the appropriateness of operation of a robot in a robot transfer system.

BRIEF DESCRIPTION OF THE DRAWINGS

FIG. 7 is a flowchart showing the sequence of simulation of a robot transfer system of the simulation device in FIG. 1.

DETAILED DESCRIPTION OF THE INVENTION

Figure 1:
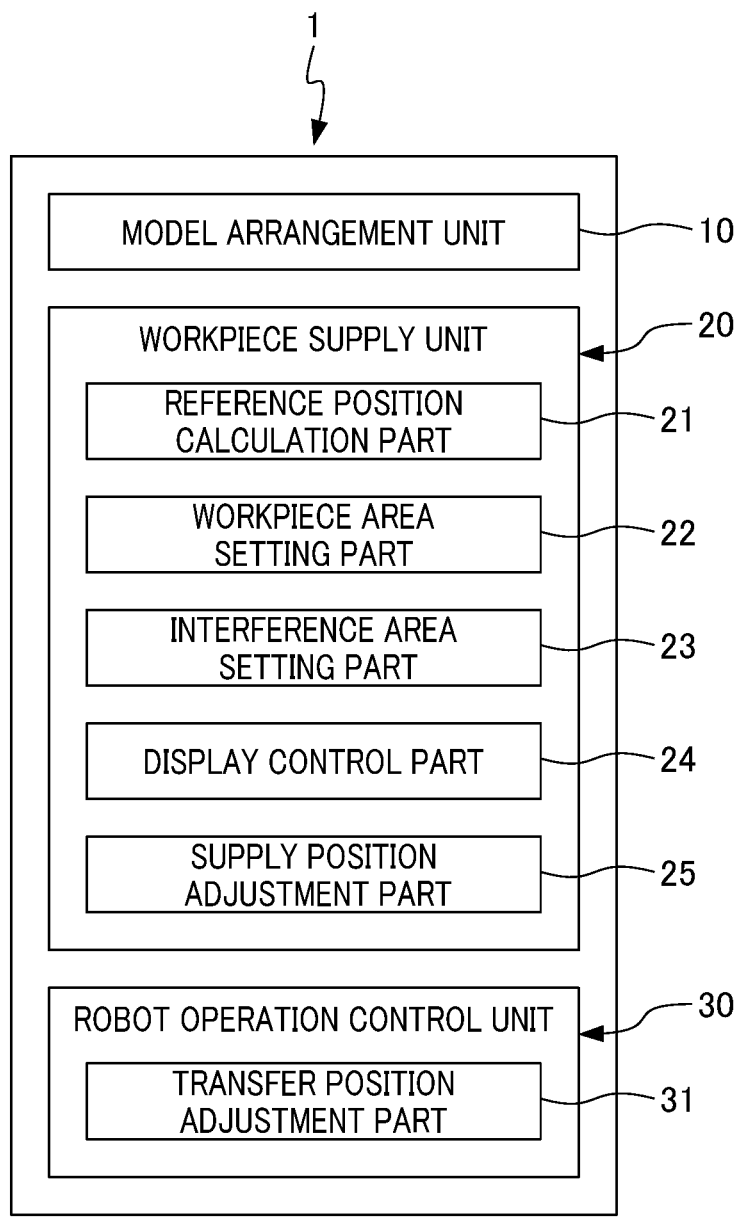
FIG. 1 is a block diagram showing the configuration of a simulation device of an embodiment of the present disclosure.

Hereinafter, an embodiment of the present disclosure will be explained while referencing the drawings. FIG. 1 shows the configuration of a simulation device 1 according to an embodiment of the present disclosure.

Figure 2:
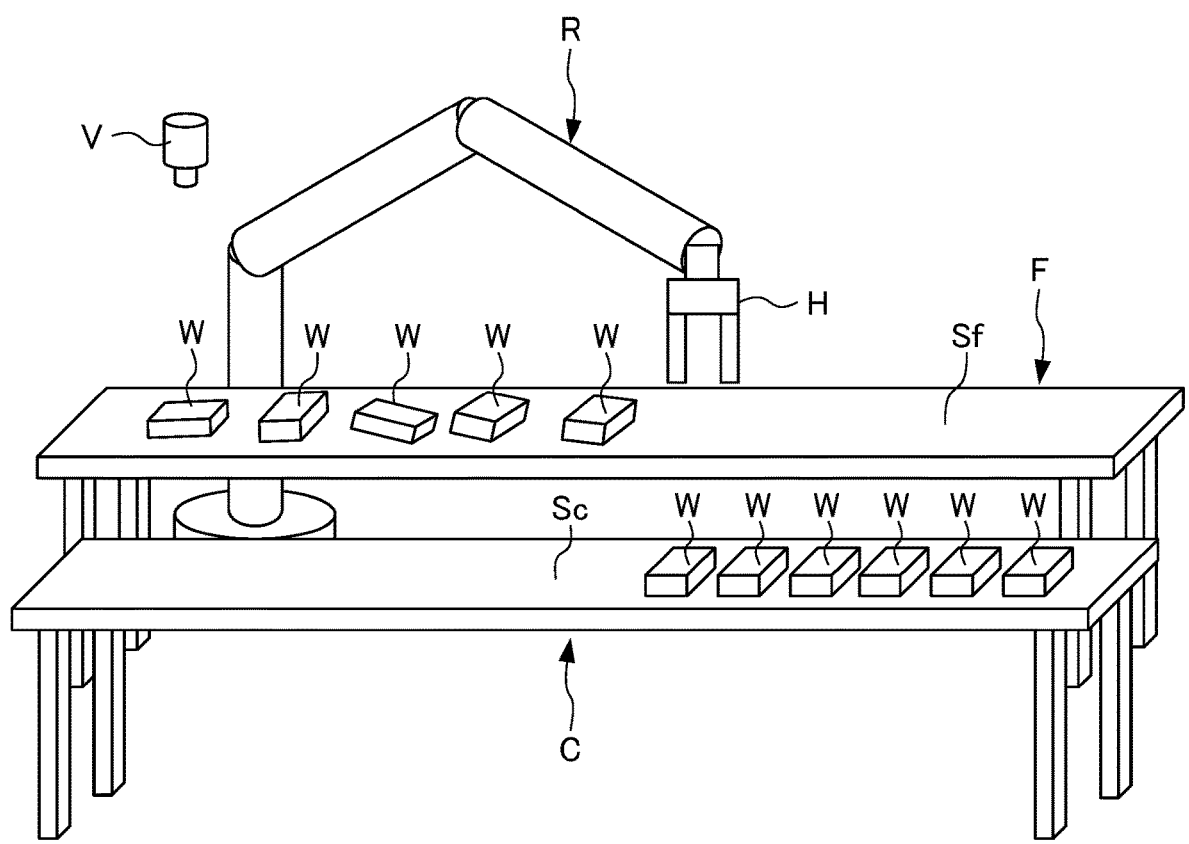
FIG. 2 is a schematic perspective view showing the configuration of a robot transfer system which is simulated by the simulation device of FIG. 1.

The simulation device 1, as shown in FIG. 2, artificially confirms the operation of the robot transfer system including: a feeder F having a conveyor surface Sf on which a workpiece W (may attach number of workpiece hereinafter) is arranged; an image processing device V which calculates the position of the workpiece W by photographing the workpiece W on the conveyor surface Sf; a robot R which has a hand H that retains the workpiece W on the conveyor surface Sf, and picks up the workpiece W from the conveyor surface Sf based on the calculation results of the image processing device V; and a receiver device C having a receiving surface Sc on which the workpiece W is arranged by the robot R.

The simulation device 1 includes: a model arrangement unit 10 which arranges three-dimensional models of the feeder F, robot R and receiving device C in virtual space; a workpiece supply unit 20 which arranges the three-dimensional model of the workpiece W on the conveyor surface Sf in the three-dimensional model of the feeder F; and a robot operation control unit 30 which causes the three-dimensional model of the robot R to operate, so as to move the three-dimensional model of the workpiece W on the conveyor Sf onto the receiving surface Sc.

The model arrangement unit 10 virtually arranges the three-dimensional model of a shape set in advance of the feeder F, robot R and receiving device C in the virtual space. For this reason, the model arrangement unit 10 stores information related to the shape and mechanism of the feeder F, robot R and receiving device C.

Figure 3:
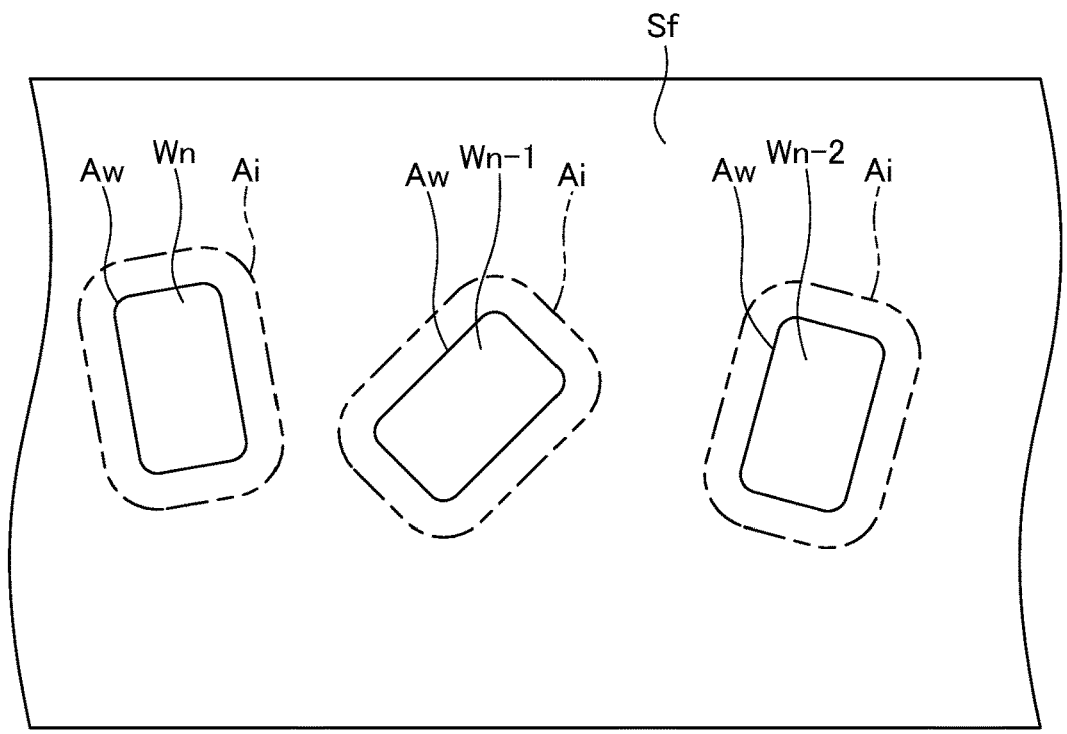
FIG. 3 is a schematic view illustrating the arrangement of workpieces on a conveyor surface of the simulation device in FIG. 1.

The workpiece supply unit 20 has a reference position calculation part 21 which calculates the position and orientation of a newly arranged workpiece Wn (n is a positive integer) following set conditions; a workpiece area setting part 22 which sets a workpiece area Aw (refer to FIG. 3) occupied by each workpiece W; an interference area setting part 23 which sets the interference area Ai (refer to FIG. 3) adjacent to the workpiece area Aw; a display control part 24 which displays a screen indicating the workpiece area Aw and interference area Ai; and a supply position adjustment part 25 which adjusts the relative position of the newly arranged workpiece Wn, so that the workpiece area Aw of the newly arranged workpiece Wn does not overlap with the workpiece area Aw and interference area Ai of the workpiece Wn−1 arranged before.

The reference position calculation part 21 decides the position and orientation (angle of horizontal direction) serving as the reference of newly arranged workpiece Wn on the conveyor surface Sf, based on parameters, for example, set in advance by the user. As the parameters which can be set by the user, the feed amount per time of the workpiece W, coordinate range in the conveying direction of the position of the workpiece W, offset range in a direction perpendicular to the conveying direction, offset range of orientation, etc. can be exemplified. The reference position calculation unit 21 may be configured so that a user can input these parameters by way of numerical input, mouse dragging on a screen, or the like.

The reference position calculation part 21 causes the conveying direction position, perpendicular direction position and orientation of the workpiece to change randomly or according to a distribution set in advance such as a Gaussian distribution or Poisson distribution, for example, within a range set by the user. It is thereby possible to reproduce the variation in supply of workpieces W depending on the upstream-side facilities of an actual robot transfer system.

The workpiece area setting unit 22 defines a area occupied by each of the workpieces W as workpiece area Aw. For this reason, the workpiece area setting part 22 stores information of the three-dimensional shape, e.g., length, width, height, etc., of a workpiece W. It should be noted that in the case of the workpiece area Aw of a plurality of workpieces W overlapping each other, the workpieces W will interfere, and is a state in which it is not possible to arrange the workpieces W in a plane on the conveyor surface Sf. The workpiece area setting part 22 may set the workpiece area Aw, for example, as a three-dimensional area having a fixed height equal to the maximum height of the workpiece W. In addition, the workpiece area setting part 22 may set a workpiece area Aw as a two-dimensional area without height information.

The interference area setting part 23 sets an interference area Ai of preset size so as to be adjacent to the workpiece area Aw in a plan view. This interference area Ai corresponds to a space in which the hand H or the workpiece W can be located by retaining by the hand H, according to the structure of the hand H of the robot R. In order to perform setting of such an interference area Ai, the interference area setting part 23 stores information specifying the shape of the interference area Ai corresponding to the workpiece W. The interference area setting part 23 may set the interference area Ai as a three-dimensional area having a fixed height equal to the maximum height of the workpiece W, or may set as a two-dimensional area without height information.

Figure 4:
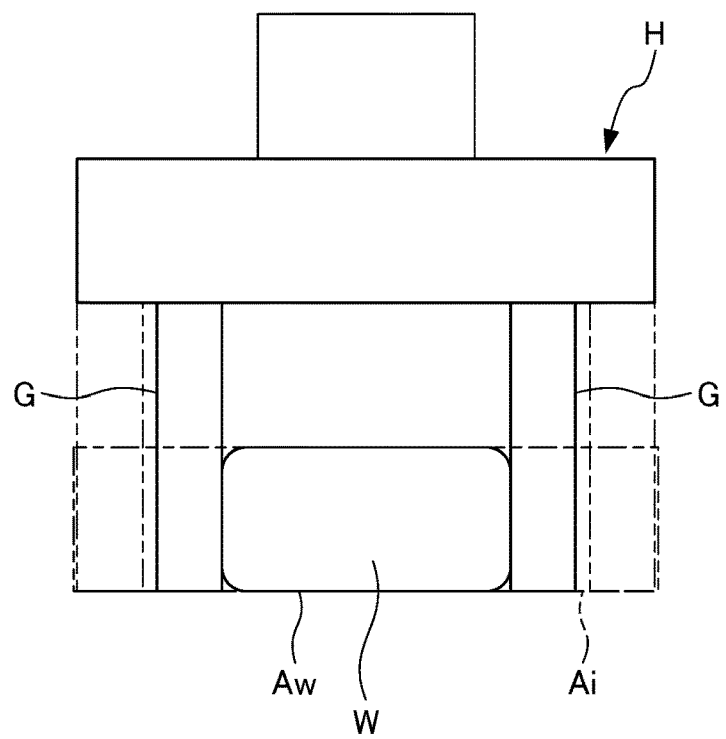
FIG. 4 is a schematic side view illustrating the relationship between a workpiece and the hand of a robot in the simulation device of FIG. 1.
Figure 5:
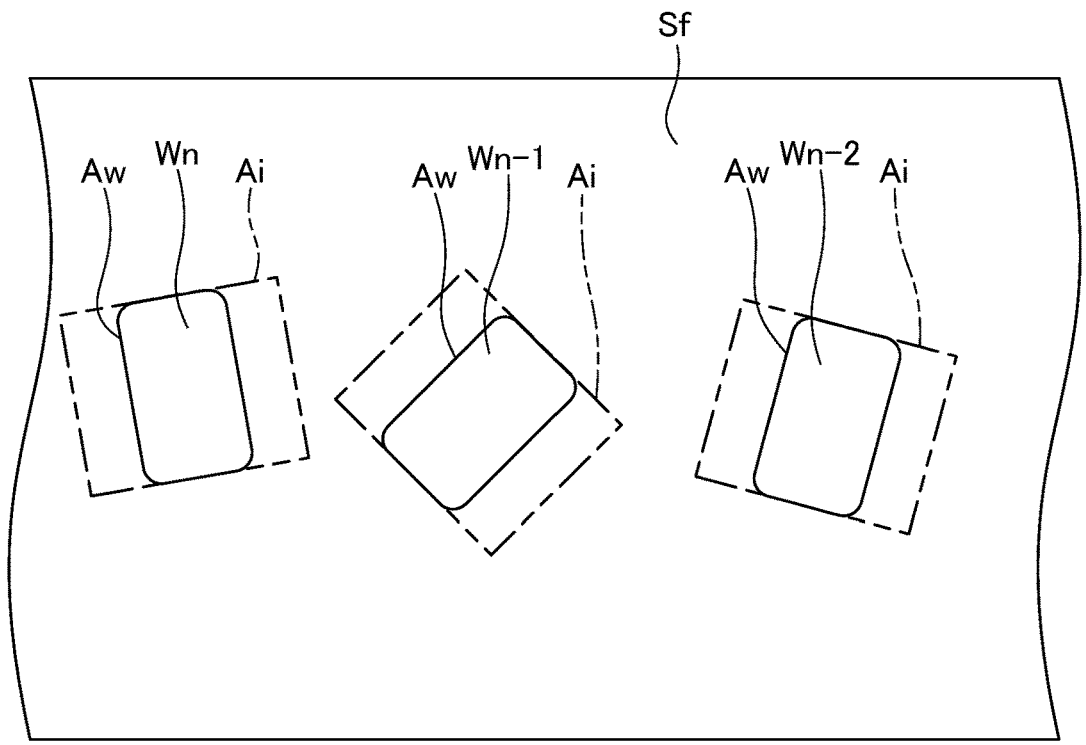
FIG. 5 is a schematic plan view exemplifying a workpiece area and interference area in the case of using the hand in FIG. 6.
Figure 6:
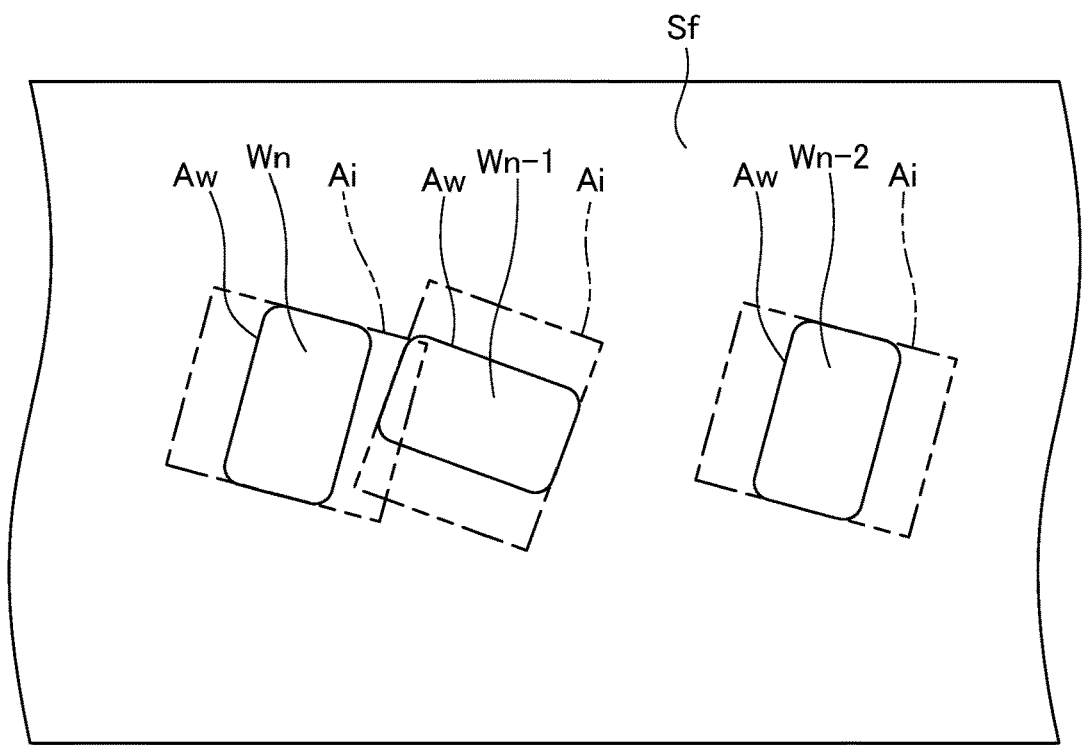
FIG. 6 is a schematic plan view exemplifying the arrangement of workpieces in a case of the positions of workpieces being adjusted in the simulation device in FIG. 1.

As an example, in the case of the hand H being a gripper having at least a pair of gripping parts G which retains lateral sides of the workpiece W as shown in FIG. 4, the interference area setting part 23 sets a space in which the gripping parts G of the hand H can be located at the side of the workpiece area Aw, as the interference area Aw. In this case, the interference area Ai is set only in a part adjacent to the lateral side held by the gripping part G of the workpiece W, as shown in FIG. 5. In addition, also in the case of the hand H having a suction cup which absorbs the top surface of the workpiece W, the suction cup deforms to slant, and there is concern over the workpiece W moving sideways at the moment when lifting the workpiece W from the conveyor surface Sf, or the moment when placing on the receiving surface Sc. For this reason, in a case that the interference of workpiece W which does not have such a directional property can occur, the interference area Ai can be set so as to surround the entire periphery of the workpiece area Aw as exemplified in FIG. 3.

The display control part 24 generates an image showing the workpiece area Aw and interference area Ai of a three-dimensional model of the workpiece W on the conveyor surface Sf, at the same viewpoint and angle of view as when the image processing device V photographs in the robot transfer system, and displays on a display device such as a display connected to the simulation device 1 or built into the simulation device 1. It is thereby possible to visually confirm interference between workpieces W.

The display control part 24 may perform display showing the workpiece area Aw and interference area Ai of three-dimensional model of the workpiece W, and allowing setting of parameters, etc. for the adjustment of the relative position of newly arranged workpiece Wn performed by the supply position adjustment part 25 described later.

The supply position adjustment part 25 adjusts the relative position of newly arranged workpiece Wn, so that the workpiece area Aw and interference area Ai of the workpiece Wn newly arranged on the conveyor surface Sf do not overlap with the workpiece area Aw of another workpiece W (normally, only the workpiece Wn−1 arranged on the conveyor surface Sf previously needs to be considered). In order to retain the workpiece W arranged on the conveyor surface Sf by the hand H, it is necessitated for another workpiece Wn−1 not to be present in the workpiece area Aw and interference area Ai of this workpiece W. In the case of the robot operation control unit 30 causing the workpiece W arranged by the workpiece supply unit 20 to be picked up from the conveyor surface Sf in the order in which arranged by the workpiece supply unit 20 and moved onto the receiving surface Sc, the supply position adjustment part 25 arranges the new workpiece Wn so that the workpiece area Aw of the new workpiece Wn does not overlap with the workpiece area Aw and interference area Ai of the workpiece Wn−1 to be picked up first by the robot R, and arranged on the conveyor surface Sf earlier. It thereby becomes possible for the robot R to pick up the workpieces W in the order arranged on the conveyor surface Sf from the conveyor surface Sf.

As shown in FIG. 7, although the workpiece area Aw and interference area Ai of the newly arranged workpiece Wn do not overlap with the workpiece area Aw of another workpiece Wn−1, a case of the workpiece area Aw of the workpiece Wn−1 arranged first overlapping with the interference area Ai of the newly arranged workpiece Wn can also be considered. In this case, it is not possible to first pick up the workpiece W which was arranged on the conveyor surface Sf later by the robot R from the conveyor surface Sf. In the case of there being a possibility of the robot operation control unit 30 picking up the workpieces W on the conveyor surface Sf in a different order than the order in which arranged by the workpiece supply unit 20, the supply position adjustment part 25 further adjusts the relative position of the newly arranged workpiece Wn, so that the workpiece area Aw and interference area Ai of the newly arranged workpiece Wn do not overlap with the workpiece area Aw of the workpiece Wn−1 arranged first. In other words, the supply position adjustment unit 25 may adjust the relative position of the newly arranged workpiece Wn, so that the workpiece area Aw and interference area Ai of the newly arranged workpiece Wn do not interfere with the workpiece area Aw and interference area Ai of another workpiece Wn−1. In this case, it becomes possible for the robot operation control unit 30 to pickup the workpieces W on the conveyor surface Sf in any order by the robot R.

Adjustment of the relative position of the newly arranged workpiece Wn by the supply position adjustment part 25 may be performed by adjusting at least one of the absolute position in virtual space at which newly arranging the workpiece Wn or the orientation of the newly arranged workpiece Wn. In this way, it is possible to exclude overlapping of the workpiece area Aw and interference area Ai of workpieces W by adjusting the absolute position and/or orientation of the newly arranged workpiece Wn. Adjustment of the absolute position of the workpiece Wn preferably includes movement in the perpendicular direction to the conveying direction. When trying to eliminate overlapping of the workpiece area Aw and interference area Ai with the workpiece Wn−1 arranged prior to the new workpiece W by movement in the conveying direction, it comes to move the arrangement position of the newly arranged workpiece Wn to the upstream side of the conveyor surface Sf. In this case, due to consecutively causing interference of the workpiece area Aw and interference area Ai between this workpiece Wn and the next workpiece Wn+1, there is concern over no longer being able to supply the required amount of workpieces W per time.

In addition, the adjustment of relative position of newly arranged workpiece Wn may be performed within a preset search range. It is thereby possible to suppress an increase in computational load, and arrange the workpieces W periodically on the conveyor surface Sf so as not to interfere. This search range is defined as an immobile coordinate range in virtual space, and it is preferable to be set so as to be able to prevent the workpiece W from no longer being able to supply due to consecutive interference, even if moving the arrangement position of the workpiece Wn within this range to the upstream side of the conveyor surface Sf. In addition, the adjustment of the relative position of the newly arranged workpiece Wn within this search range may be performed by setting priority ranking in the movement direction of position. As an example, it may be configured so as cancel interference by first moving the arrangement position of the workpiece Wn in the conveying direction, and in the case of not being able to cancel interference even if moving until the outer edge of the search range, further moving in the perpendicular direction.

In addition, the adjustment of the relative position of the newly arranged workpiece Wn by the supply position adjustment part 25 may be performed by adjusting the movement speed of the conveyor surface Sf, or may be performed by adjusting the number of workpieces arranged on the conveyor surface Sf (number of workpieces W arranged per time). If increasing the movement speed of the conveyor surface Sf, since the distance between workpieces W inevitably becomes larger, it is possible to cancel overlapping of the workpiece area Aw and interference area Ai. In addition, by reducing the number of workpieces W arranged on the conveyor surface Sf, since the distance between workpieces W inevitably becomes larger, it is possible to cancel overlap of the workpiece area Aw and interference area Ai.

The robot operation control unit 30 picks up the workpiece W on the conveyor surface Sf of the feeder F to the robot R, and repeatedly performs operation to place on the receiving surface Sc of the receiver device C. The robot operation control unit 30 has a transfer position adjustment part 31 which decides the relative position of the newly arranged workpiece Wn, so that the workpiece area Aw and interference area Ai of the newly arranged workpiece Wn on the receiving surface Sc do not overlap the workpiece area Aw of another workpiece W which was previously arranged. The simulation device 1 can thereby reproduce the operation causing the workpiece W to move over the receiving surface Sc from over the conveyor surface Sf by the robot R.

FIG. 7 shows the sequence of simulation of the robot transfer system in the simulation device 1. The simulation in the simulation device 1 includes: a step of arranging a three-dimensional model of the robot transfer system in virtual space (Step S1); a step of calculating a reference position at which arranging the three-dimensional model of the workpiece W on the conveyor surface Sf of the three-dimensional model of the feeder F (Step S2); a step of setting the workpiece area Aw of the workpiece W to be arranged (Step S3); a step of setting the interference area Ai of the workpiece W to be arranged (Step S4); a step of displaying the workpiece area Aw and interference area Ai on the screen (Step S5); and a step of adjusting the position of the workpiece W to be arranged (Step S6).

In Step S1, the model arrangement unit 10 arranges the three-dimensional models of the feeder F, robot R and receiving device C in virtual space.

In Step S2, the reference position calculation part 21 calculates a position serving as a reference of the three-dimensional model of the workpiece W supplied on the conveyor surface Sf of the feeder F.

In Step S3, the workpiece area setting part 22 sets the workpiece area Aw at the reference position calculated in Step S2.

In Step S4, the interference area setting part 23 sets the interference area Ai to be adjacent in a predetermined direction to the workpiece area Aw set in Step S3.

In Step S5, the display control part 24 causes the workpiece area Aw and interference area Ai of the workpiece Wn newly arranged on the conveyor surface Sf, the workpiece area Aw and interference area Ai of a neighboring workpiece n−1 already arranged to be displayed on the display device.

In Step S6, the supply position adjustment part 25 adjusts the position of the newly arranged workpiece Wn so that the workpiece area Aw of the newly arranged workpiece Wn does not overlap with the workpiece area Aw and interference area Ai of the workpiece Wn−1 which is already arranged.

As mentioned above, the simulation device 1 includes the workpiece supply unit 20 having the supply position adjustment part 25 which adjusts the relative position of the newly arranged workpiece Wn, so that the workpiece area Aw of the newly arranged workpiece Wn does not overlap the workpiece area Aw and interference area Ai of the workpiece Wn−1 which was previously arranged; therefore, it is possible to supply workpieces W to the feeder F in an arrangement allowing to be picked up by the robot R. The simulation device 1 can thereby accurately confirm the appropriateness of operation of the robot R in the robot transfer system, by eliminating flaws in the supply of workpieces W.

Although an embodiment of a simulation device according to the present disclosure has been explained above, the simulation device according to the present disclosure is not to be limited to the aforementioned embodiment. In addition, the effects described in the present disclosure are merely listing the most favorable effects produced from the present disclosure, and the effects from the simulation device according to the present disclosure are not to be limited to those described in the present embodiment.

In the simulation device according to the present disclosure, the workpieces may be arranged in several rows on the conveyor surface and receiving surface. In addition, in the simulation device according to the present disclosure, the receiving device may be a table or the like having a fixed receiving surface.

EXPLANATION OF REFERENCE NUMERALS 1 simulation device
10 model arrangement unit
20 workpiece supply unit
21 reference position calculation part
22 workpiece area setting part
23 interference area setting part
24 display control part
25 supply position adjustment part
30 robot operation control unit
31 transfer position adjustment part
F feeder
C receiving device
H hand
R robot
Sc receiving surface
Sf conveyor surface
V image processing device
W workpiece

What is claimed is:

1. A simulation device which artificially confirms operation of a robot transfer system including: a feeder having a conveyor surface on which a workpiece is arranged; an image processing device which photographs the workpiece on the conveyor surface and calculates a position of the workpiece; a robot which has a hand that retains the workpiece on the conveyor surface, and picks up the workpiece from the conveyor surface based on a calculation result of the image processing device; and a receiving device which has a receiving surface on which the workpiece is arranged by the robot, the simulation device comprising:
a processor configured to:
arrange three-dimensional models of the feeder, the robot and the receiving device in virtual space;
arrange the three-dimensional model of the workpiece on the conveyor surface in the three-dimensional model of the feeder;
cause the three-dimensional model of the robot to operate so as to move the three-dimensional model of the workpiece on the conveyor surface to over the receiving surface;
calculate a position and orientation of the workpiece to be newly arranged, according to set conditions;
set a workpiece area occupied by the workpiece;
set an interference area adjacent to the workpiece area; and
adjust a relative position of the workpiece to be newly arranged, so that the workpiece area of the workpiece to be newly arranged does not overlap with the workpiece area and the interference area of the workpiece arranged previously.

2. The simulation device according to claim 1, wherein the processor is further configured to adjust the relative position of the workpiece to be newly arranged, so that the workpiece area and the interference area of the workpiece to be newly arranged on the conveyor surface do not overlap with the workpiece area of another of the workpiece.

3. The simulation device according to claim 1, wherein the processor is further configured to adjust at least either of an absolute position at which newly arranging the workpiece and an orientation of the workpiece to be newly arranged.

4. The simulation device according to claim 1, wherein the processor is further configured to adjust the relative position of the workpiece to be newly arranged, by way of adjusting a movement speed of the conveyor surface.

5. The simulation device according to claim 1, wherein the processor is further configured to adjust the relative position of the workpiece to be newly arranged, by way of adjusting a number of the workpieces arranged on the conveyor surface.

6. The simulation device according to claim 1, wherein the processor is further configured to control displaying of a screen indicating the workpiece area and the interference area.

7. The simulation device according to claim 1, wherein the processor is further configured to decide a relative position of the workpiece to be newly arranged, so that the workpiece area and the interference area of the workpiece to be newly arranged on the receiving surface do not overlap with the workpiece area of another of the workpiece which was arranged previously.

* * * * *